United States Patent
Lutz et al.

(10) Patent No.: US 7,386,580 B2
(45) Date of Patent: Jun. 10, 2008

(54) DATA PROCESSING APPARATUS AND METHOD FOR COMPUTING AN ABSOLUTE DIFFERENCE BETWEEN FIRST AND SECOND DATA ELEMENTS

(75) Inventors: David Raymond Lutz, Austin, TX (US); Christopher Neal Hinds, Austin, TX (US)

(73) Assignee: Arm Limited, Cambridge (GB)

( * ) Notice: Subject to any disclaimer, the term of this patent is extended or adjusted under 35 U.S.C. 154(b) by 714 days.

(21) Appl. No.: 10/803,162

(22) Filed: Mar. 18, 2004

(65) Prior Publication Data
US 2005/0210086 A1    Sep. 22, 2005

(51) Int. Cl.
*G06F 15/00*    (2006.01)
(52) U.S. Cl. .................................... 708/201
(58) Field of Classification Search ......... 708/200–209
See application file for complete search history.

(56) References Cited

U.S. PATENT DOCUMENTS

| | | | | |
|---|---|---|---|---|
| 4,218,751 A | * | 8/1980 | McManigal | 708/201 |
| 4,692,889 A | * | 9/1987 | McNeely | 708/441 |
| 4,849,923 A | * | 7/1989 | Samudrala et al. | 708/505 |
| 5,111,421 A | * | 5/1992 | Molnar et al. | 708/505 |
| 5,235,536 A | * | 8/1993 | Matsubishi et al. | 708/524 |
| 5,373,459 A | * | 12/1994 | Taniguchi | 708/201 |
| 5,835,389 A | * | 11/1998 | Wong | 708/201 |
| 6,578,060 B2 | * | 6/2003 | Chen et al. | 708/505 |
| 6,691,145 B1 | * | 2/2004 | Shibata et al. | 708/801 |
| 7,191,199 B2 | * | 3/2007 | Simpson et al. | 708/201 |

OTHER PUBLICATIONS

Lutz et al; "Early Zero Detection"; Proceeding of the 1996 International Conference on Computer Design (ICCD'96); 1996 IEEE, pp. 545-550.

* cited by examiner

*Primary Examiner*—Chat C. Do
(74) *Attorney, Agent, or Firm*—Nixon & Vanderhye P.C.

(57) ABSTRACT

A data processor computes an absolute difference between portions of first and second data elements. At least a part of the first and second data elements are compared to determine which data element is larger. A first comparison result value is produced if the first element is larger and a second comparison result value if the second element is larger. An absolute difference is computed between a portion of the first and second data elements. One of the portions is inverted and added to the other portion and to the comparison result to produce an intermediate result. An absolute difference is provided with improved speed either as the intermediate result or an inverted version of the intermediate result dependent on the comparison result.

22 Claims, 8 Drawing Sheets

DATA PROCESSING APPARATUS AND METHOD FOR COMPUTING AN ABSOLUTE DIFFERENCE BETWEEN FIRST AND SECOND DATA ELEMENTS

BACKGROUND OF THE INVENTION

1. Field of the Invention

The present invention relates to a data processing apparatus and method for computing an absolute difference between first and second data elements, and in particular between a portion of the first and second data elements.

2. Description of the Prior Art

For two data elements, the absolute difference is the magnitude of the difference between the two data elements, expressed as a positive value. When performing a data processing operation on first and second data elements, there are many instances where as part of that data processing operation it is necessary to compute the absolute difference between a portion of the two data elements.

One known approach for performing such an absolute difference computation is to use an end around carry adder, followed by a ones complement operation if negation is required. If the two data element portions are A and B, data element portion B is inverted and added to data element portion A within the end around carry adder. If A is larger than B, then this will be indicated by a logic zero value in the most significant bit position of the output from the end around carry adder, and in such instances no negation is required. However, if A is less than B, then the output from the end around carry adder will be negative (as indicated by a logic one value in the most significant bit position), and the negation of the result is required in order to produce the absolute difference value.

One problem with using the end around carry adder approach is that an end around carry adder is relatively slow when compared with a normal adder. This speed problem is compounded by the fact that the selection of the adder's output or the inverted version of the output can only be made once the most significant bit of the output from the end around carry adder is known, which adds further time delay in the generation of the absolute difference value.

As there is a general desire to perform data processing operations more and more quickly, this tends to lead to reduction in the clock period (also referred to herein as cycle time) within the data processing apparatus. As the cycle time reduces, the time taken by an end around carry adder to compute an absolute difference value can become unacceptable.

An alternative approach for computing an absolute difference value is to determine which of the two data elements is the largest, and then to swap the ordering of the data element portions if required so that a normal adder can be used to compute the absolute difference value. The detection of which data element is the largest can often be performed in a clock cycle prior to the clock cycle in which the computation of the difference takes place within the adder. Nevertheless, as cycle times decrease, there may be insufficient time to perform any required swap, followed by the addition, within a single clock cycle.

Accordingly, it would be desirable to provide an improved technique for computing an absolute difference between portions of first and second data elements.

SUMMARY OF THE INVENTION

Viewed from a first aspect, the present invention provides a data processing apparatus comprising: processing logic operable to perform a data processing operation on first and second data elements, the processing logic comprising: comparison logic operable to compare at least a part of the first and second data elements in order to determine which of the first and second data elements is a larger data element, the comparison logic being operable to produce a comparison result which has a first value if the first data element is the larger data element and a second value if the second data element is the larger data element; absolute difference logic operable to compute an absolute difference between a portion of the first data element and a portion of the second data element, the absolute difference logic comprising: adder logic operable to invert one of said portions to produce an inverted data element portion and to add the inverted data element portion to the other of said portions and to the comparison result received from the comparison logic in order to produce an intermediate result; and output logic operable to generate an inverted version of the intermediate result and to output as the absolute difference either the intermediate result or the inverted version of the intermediate result dependent on the comparison result.

In accordance with the present invention, a comparison is performed between at least a part of the first and second data elements in order to determine which of the first and second data elements is the larger data element, with a comparison result being produced indicative of that comparison. This comparison result is then input to absolute difference logic used to compute an absolute difference between a portion of the first data element and a portion of the second data element. However, in contrast to the known prior art technique described earlier, there is no requirement to swap the order of the first and second data element portions dependent on the comparison result before those first and second data element portions are input to adder logic within the absolute difference logic. Instead, in accordance with the present invention, the adder logic is arranged to invert one of the portions (i.e. the portion of the first data element or the portion of the second data element) to produce an inverted data element portion and to add the inverted data element portion to the other of the portions (i.e. the portion of the second data element or the portion of the first data element) and to the comparison result received from the comparison logic in order to produce an intermediate result.

For situations where the data element portion that wasn't inverted is larger than the data element portion that was inverted, this intermediate result will correctly specify the absolute difference. However, for the converse situation where the data element portion that was inverted is larger than the data element portion that was not inverted, the intermediate result will not specify the absolute difference. However, in accordance with the present invention, it has been realised that by appropriate setting of the value of the comparison result, with this value of the comparison result then being incorporated within the addition performed within the adder logic, the required absolute difference for this situation can be produced merely by inverting the intermediate result produced.

Accordingly, through use of the present invention, a significant time saving in the computation of the absolute difference is realised by avoiding the need to swap the order of the first and second data element portions dependent on the result of the comparison performed by the comparison logic, thus enabling the absolute difference logic of the present invention to be used in a data processing apparatus where the cycle times are too short to enable use of the known prior art techniques for computing absolute difference values.

It will be appreciated that the values set for the comparison result can be chosen dependent on which data element portion is inverted by the adder. However, in one embodiment, the adder logic is operable to invert the portion of the second data element, and the comparison result is set to a logic 0 value if the second data element is the larger data element, and is set to a logic 1 value otherwise, the output logic being operable to output as the absolute difference the inverted version of the intermediate result if the comparison result has a logic 0 value, and to output as the absolute difference the intermediate result if the comparison result has a logic 1 value.

It will be appreciated that the output logic can be constructed in a variety of ways. However, in the above embodiment, the output logic may include an inverter to generate the inverted version of the intermediate result, and a multiplexer arranged to receive both the intermediate result and the inverted version of the intermediate result, with the output from the multiplexer being driven dependent on the value of the comparison result.

In one embodiment, the comparison result is set to the first value if the first data element and the second data element have the same value. Hence, in this embodiment, the comparison result is set to the first value if the first data element is larger than or equal to the second data element, whereas the comparison result is set to the second value if the second data element is larger than the first data element.

It will be appreciated that the comparison logic can be arranged to operate in a variety of ways. However, in one embodiment, the comparison logic is operable to perform a non-redundant subtract operation on said at least a part of the first and second data elements, and the comparison result comprises a carry out result of the non-redundant subtract operation.

The first and second data elements can take a variety of forms. However, in one embodiment, the first and second data elements are floating point data elements, the first floating point data element specifying a first significand and the second floating point data element specifying a second significand, and the absolute difference logic being operable to compute the absolute difference between the first significand and the second significand. As will be appreciated by those skilled in the art, the significand is typically not specified directly by a floating point data element, but rather is derived from a fraction value specified by the floating point data element. In particular, the significand is specified as "1.<fraction value>". In one particular embodiment, each of the floating point data elements comprise sign, exponent and fraction portions, with the first and second significands being derived from the corresponding fraction portions of the first and second floating point data elements.

In embodiments where the first and second data elements are floating point data elements, it will be appreciated that the comparison logic can be arranged in a variety of ways. In one embodiment, the at least a part of the first and second data elements compared by the comparison logic comprises the exponent and fraction portions of the first and second floating point data elements. However, in other embodiments, for example where additional logic is provided to determine whether the exponent portions of the first and second floating point data elements are equal, the comparison logic can be arranged to compare only the fraction portions of the first and second floating point data elements, or the significands of the first and second floating point data elements.

In one embodiment, the data processing apparatus may be arranged to perform a data processing operation on only one first data element and one second data element at a time. However, in alternative embodiments, a Single Instruction Multiple Data (SIMD) data processing operation may be performed, wherein the data processing apparatus is operable to receive first and second operands, with the first operand comprising a plurality of the first floating point data elements and the second operand comprising a corresponding plurality of the second floating point data elements. In accordance with the SIMD technique, the data processing operation is performed in parallel on each pair of first and second floating point data elements provided by the first and second operands. In accordance with one such embodiment, the comparison logic and the absolute difference logic are replicated within the data processing apparatus for each pair of first and second floating point data elements provided by the first and second operands.

In an alternative embodiment of the present invention, the first and second data elements are integer data elements, and the portion of the first and second data elements that the absolute difference logic is operable to compute the absolute difference for is the entirety of the first and second integer data elements.

In such embodiments, the at least a part of the first and second data elements compared by the comparison logic preferably comprises the entirety of the first and second integer data elements.

In one embodiment where the first and second data elements are integer data elements, SIMD processing is performed within the data processing apparatus. In accordance with such embodiments, the data processing apparatus is operable to receive first and second operands, the first operand comprising a plurality of said first integer data elements, and the second operand comprising a corresponding plurality of said second integer data elements, said comparison logic being operable to receive the first and second operands and to produce, for each pair of first and second integer data elements provided by the first and second operands, an associated comparison result. Hence, in accordance with this embodiment, the comparison logic is not replicated for each pair of first and second integer data elements, but rather the entirety of the first and second operands are routed to the comparison logic, with the comparison logic being able to produce an associated comparison result for each pair of first and second integer data elements.

In accordance with one such embodiment, the absolute difference logic is operable to receive the first and second operands; the adder logic is operable to invert one of the first and second operands to produce a plurality of inverted integer data elements and, for each pair of first and second integer data elements, to add the associated inverted data element to the other of the first and second data elements and to the associated comparison result received from the comparison logic in order to produce an associated intermediate result; and the output logic is operable to generate an inverted version of each associated intermediate result and, for each pair of first and second integer data elements, to output as the associated absolute difference either the associated intermediate result or the inverted version of the associated intermediate result dependent on the associated comparison result. Hence, as with the comparison logic, the absolute difference logic is not replicated for each pair of first and second integer data elements, but rather the absolute difference logic is operable to receive the entirety of the first and second operands, with the adder logic producing an associated intermediate result for each pair of first and second integer data elements, and the output logic being arranged to output an associated absolute difference for each pair of first and second integer data elements.

Viewed from the a second aspect, the present invention provides a method of operating a data processing apparatus to compute an absolute difference between a portion of a first data element and a portion of a second data element, comprising the steps of: (a) comparing at least a part of the first and second data elements in order to determine which of the first and second data elements is a larger data element, and producing a comparison result which has a first value if the first data element is the larger data element and a second value if the second data element is the larger data element; (b) employing adder logic to invert one of said portions to produce an inverted data element portion and to add the inverted data element portion to the other of said portions and to the comparison result produced at said step (a) in order to produce an intermediate result; and (c) generating an inverted version of the intermediate result and outputting as the absolute difference either the intermediate result or the inverted version of the intermediate result dependent on the comparison result.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

A data processing apparatus may be arranged to perform a data processing operation on various types of data element. One type of data element which may be subjected to such data processing operations is the floating point data element. A floating point number can be expressed as follows:

$$\pm 1.x * 2^y$$

where: x=fraction
1.x=significand (also known as the mantissa)
y=exponent

A data processing apparatus arranged to perform certain data processing operations on first and second floating point data elements may provide both a near processing path and a far processing path for performing the data processing operation. In one embodiment, the near processing path can be used to perform unlike-signed addition operations on the first and second floating point data elements. Further, the near path can be used if the first and second point floating data elements require at most a 1-bit alignment, whereas otherwise the far path needs to be used. When the input floating point data elements require at most a 1-bit alignment, it is possible that when performing an unlike-signed addition (i.e. equivalent to subtracting one data element from the other) massive cancellation may occur, and to enable the resultant floating point value to be correctly aligned, it is then necessary to provide normalization logic within the near path. Such logic is not required in the far path. However, in the far path it is necessary to provide rounding logic due to the fact that the data elements may need more than a 1-bit alignment. Such rounding logic is not required in the near path.

Figure 1:
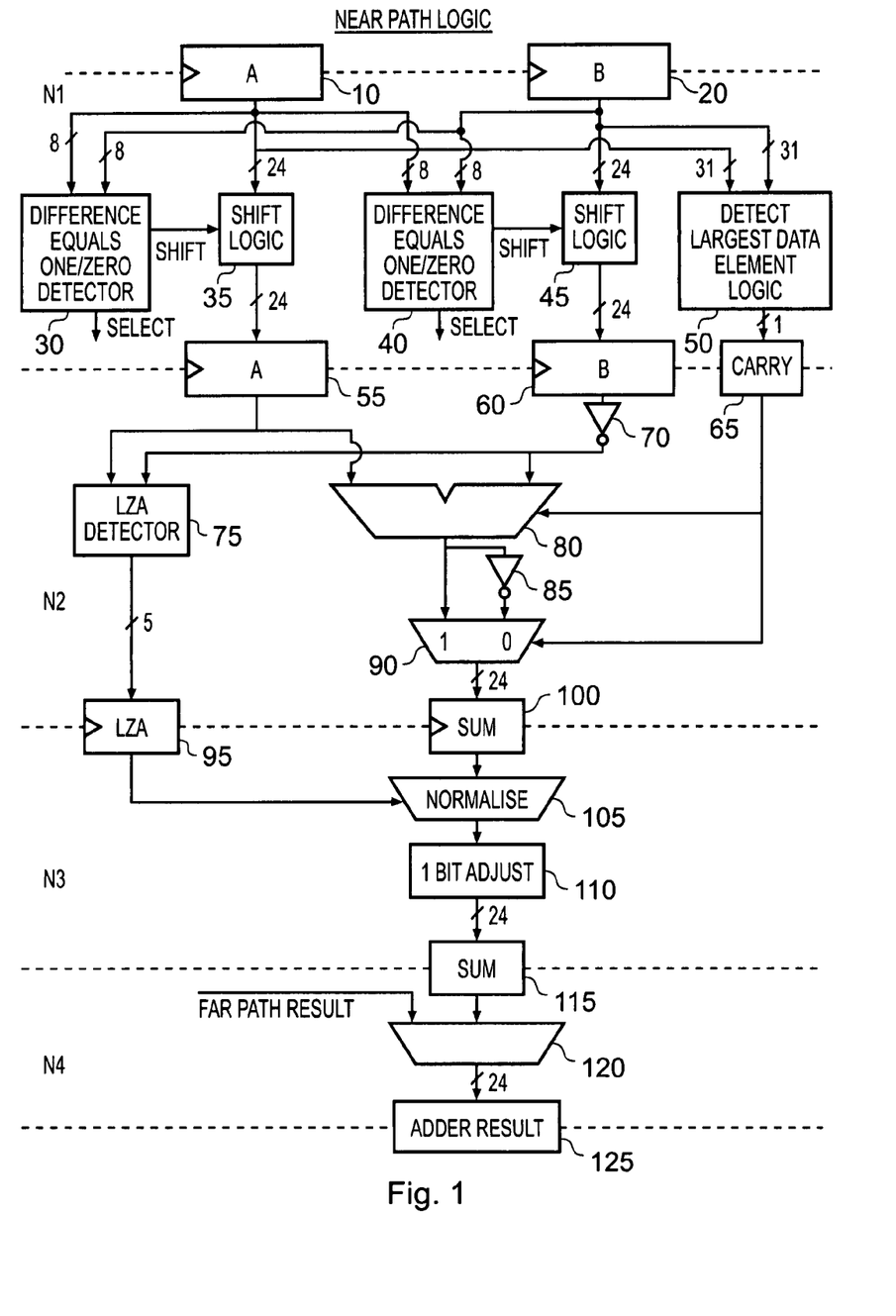
FIG. 1 is a block diagram illustrating logic provided within a near processing path of a data processing apparatus providing a near path and a far path for performing a data processing operation on first and second floating point data elements.

FIG. 1 is a block diagram illustrating logic provided within the near processing path of a data processing system to perform the necessary processing on the significand portions of first and second floating point data elements when performing an unlike-signed addition in accordance with one embodiment. In particular, it can be seen from FIG. 1 that the illustrated near path logic is contained within four pipeline stages N1 to N4. The first floating point data element A is stored in the register 10 whilst the second floating point data element B is stored in the register 20. It will be appreciated that the floating point values A and B may be single precision floating point values or double precision floating point values. However, in the example illustrated in FIG. 1, it is assumed that both input data elements are single precision floating point values. Such single precision values are 32-bit values, with the most significant bit specifying a sign value, the next 8 bits specifying an exponent value, and the final 23 bits specifying a fraction value.

From the 23-bit fraction value, a 24-bit significand can be constructed, and the 24-bit significand of the first data element is routed to associated shift logic 35 during the first pipeline stage, whilst the corresponding 24-bit significand of the second data element B is routed to associated shift logic 45 during the first pipeline stage.

Also, during this pipeline stage, the 8-bit exponents of both data elements are routed to the two detectors 30, 40, the detector 30 being associated with shift logic 35 and the detector 40 being associated with shift logic 45. As mentioned earlier, for the near path to be used, there needs to be at most a 1-bit alignment between the first and second floating point data elements, and the presence of this alignment condition is detected by the detectors 30, 40 by a comparison of the exponents of both input data elements. As will be discussed in more detail with reference to FIG. 2, each detector 30, 40 seeks to detect this alignment condition by performing a number of half adder operations in a manner such that the detection of the alignment condition can be determined from analysis of the sum data value alone.

Figure 2:
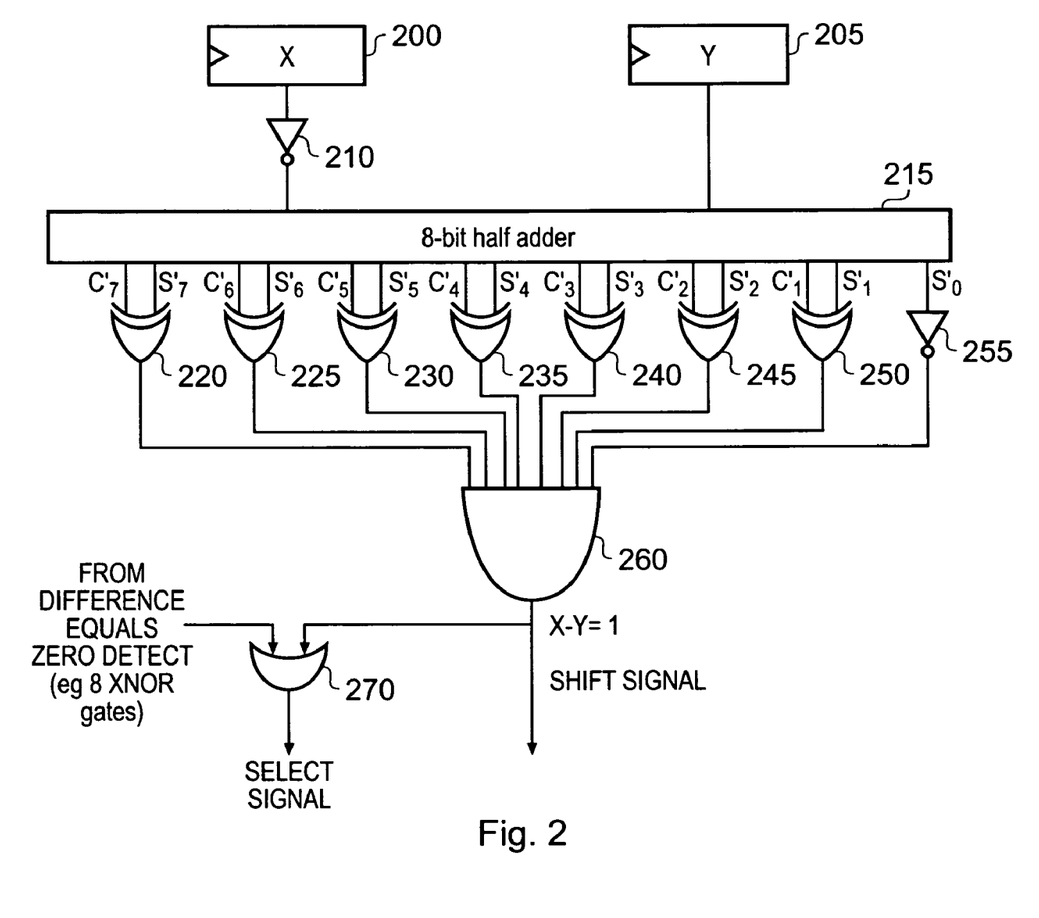
FIG. 2 is a diagram illustrating logic provided within the difference equals one/zero detector of FIG. 1.

Before discussing the logic of FIG. 2, the following background is provided concerning the operation of an n-bit half adder and the manner in which the half adder operations can be performed to enable solely the analysis of the resultant sum value to provide an indication of the presence of the alignment condition.

An n-bit half adder consists of n independent half adders. It takes two n-bit two's complement numbers as inputs, and produces two outputs: an n-bit sum and an n-bit carry. In the present context, the exponent values are unsigned values that can be treated as two's complement numbers. Let $X=x_{n-1} \ldots x_1 x_0$, and $Y=y_{n-1} \ldots y_1 y_0$ be n-bit words with low order bits $x_0$ and $y_0$. An n-bit half adder produces a carry word $C=c_{n-1} \ldots c_1 0$ and a sum word $S=s_{n-1} \ldots s_1 s_0$ such that:

$$c_i = x_{i-1} \text{ AND } y_{i-1} \quad (1)$$

$$s_i = x_i \text{ XOR } y_i \quad (2)$$

Note that $c_0$ is always 0, and that $C+S=X+Y$ (modulo $2^n$).

By definition, (C,S) is in n-bit half-adder form (also referred to as n-bit h-a form) if there exist n-bit X and Y satisfying equations 1 and 2. We write $(C,S)=ha(X,Y)$, and the modifier "n-bit" can be omitted unless it is necessary for clarity.

Theorem 1 Let (C,S) be a number in h-a form. Then it can be proved that the situation where $S=-1$ means that $C+S=-1$.

Proof

[⇒] (C,S) is in h-a form, so there exist X and Y such that $X+Y=-1$ and $(C,S)=ha(X,Y)$. By the definition of a two's complement number, $X+Y=-1$ means that $Y=\overline{X}$. Then by equation 2, $S=X \text{ XOR } \overline{X}=-1$.

[⇐] By the definition of h-a from (see equations (1) and (2) above), only one of $c_i$ and $s_{i-1}$ can be set for $i=1, \ldots, n-1$, so $C=0$, and $C+S=-1$.

The above Theorem 1 was discussed in the paper "Early Zero Detection" by D Lutz et al, Proceedings of the 1996 International Conference on Computer Design, pages 545 to 550. However, it was only discussed in the context of integer arithmetic.

By the above Theorem 1, it can be seen that if it is desired to determine whether two numbers are equal, then a half adder operation can be performed using the two numbers as inputs, and if the sum value has a value of $-1$, this will indicate that the carry value is zero, and that the two numbers are hence equal. However, in the current context of the detectors 30, 40 in FIG. 1, a key requirement is to detect whether the two input exponents differ by one. In other words, if the two exponents are considered to be X and Y, then the detector logic 30, 40 needs to determine whether $X-Y=1$ or $Y-X=1$. The following discussion will illustrate why, through the use of two half adder operations (or their equivalent), such an alignment condition can still be detected merely by reviewing the value of the sum data value produced.

Lemma 1 Given two n-bit numbers X and Y, then it can be shown that the equation $X-Y=1$ is equivalent to the equation $Y+\overline{X}=-2$.

Proof:

$$X-Y=1 \Leftrightarrow Y-X=-1$$

$$\Leftrightarrow Y+\overline{X}+1=-1 \text{ (by definition of two's complement numbers).}$$

$$\Leftrightarrow Y+\overline{X}=-2$$

The earlier theorem 1 provides an easy test for comparing sums with $-1$, but we need a test for comparing sums with $-2$.

Theorem 2 Let (C,S) be a number in h-a form, and suppose $c_1=0$. Then it can be proved that the situation where $S=-2$ means that $C+S=-2$.

Proof: [⇒] Recall that $-2$ is represented in two's complement numbers as a word consisting of all ones except for a zero in the low order bit. $c_1=c_0=0$, so we cannot have $C+S=-2$ unless $s_1=1$ and $s_0=0$. Now $s_1=1$ [⇒] $c_2=0$. Again, we cannot have $C+S=-2$ unless $s_2=1$. A simple induction completes this half of the proof.

[⇐] $S=-2$ [⇒] $s_i=1$ for $i=1, 2, \ldots, n-1$. By the definition of h-a form, only one of $c_i$ and $s_{i-1}$ can be set for $i=1, \ldots, n-1$, so $c_i=0$ for $i=2, 3, \ldots, n-1$. By assumption $c_i=c_0=0$. Therefore, $C=0$, and $C+S=-2$.

The critical step in the proof above relies on the fact that the AND and XOR of two bits cannot both be true.

Note that $c_1=0$ can be guaranteed by using two levels of half adders.

FIG. 2 illustrates logic provided within each detector 30, 40 that uses the concepts set out in the above proof to detect a condition where the sum value equals $-2$, thereby indicating the presence of the required alignment condition, i.e. that the two exponents differ by one. In particular, one of the exponents X is latched in register 200 while the other exponent Y is latched in register 205. The detector 30 is used to evaluate whether subtraction of the exponent of A from the exponent of B gives a result of one, whilst the detector logic 40 is used to evaluate whether subtracting the exponent of B from the exponent of A gives a result of one. Accordingly, with reference to FIG. 2, for the detector 30, the exponent of B is placed in register 200, and the exponent of A is placed in register 205, whilst for detector logic 40, the exponent of A is placed in register 200 and the exponent of B is placed in register 205.

Figure 3:
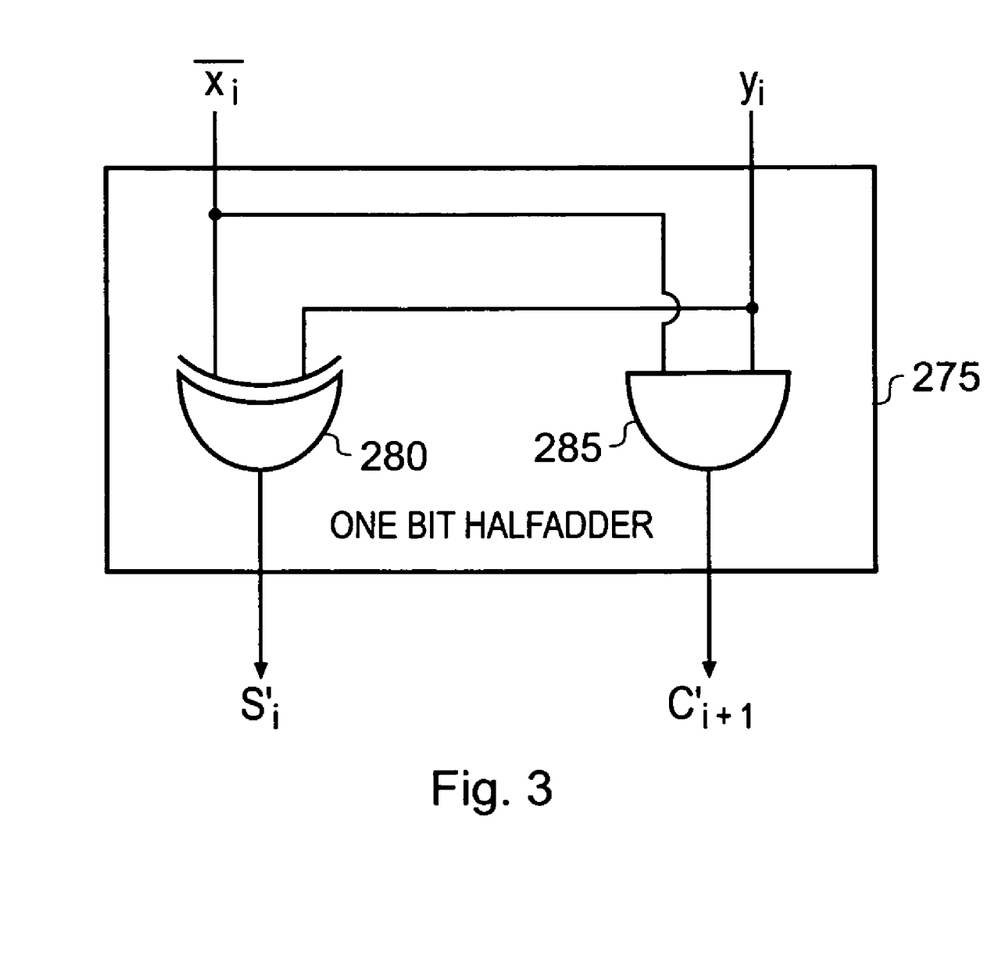
FIG. 3 is a diagram illustrating the construction of a one-bit half adder provided within the 8-bit half adder of FIG. 2.

The inverter 210 inverts the exponent value X stored in register 200 prior to input to the 8-bit half adder, and the 8-bit half adder. 215 is then arranged to perform the above equations 1 and 2 on each pair of bits received from registers 200, 205. In particular, as illustrated schematically in FIG. 3, within the 8-bit half adder 215 is provided eight 1-bit half adders 275, each 1-bit half adder 275 including an exclusive OR gate 280 and an AND gate 285. Given the earlier equations 1 and 2, it can be seen that the output from AND gate 285 is the carry value $c'_{i+1}$ and the output from XOR gate 280 is the sum value $s'_i$. The apostrophe after the c and s values is intended to indicate that these carry values and sum values are intermediate carry and sum values.

Given the earlier discussed Theorem 2, a second level of half adder is required to perform a second half adder operation before the resultant sum value can be assessed to determine whether that sum value is $-2$. However, since in this implementation there is no interest in the resultant carry value, then the second half adder operation only needs to perform a partial half adder operation in order to generate the resultant sum data value, and accordingly instead of a second 8-bit half adder, the sequence of XOR gates 220, 225, 230, 235, 240, 245 and 250 can be used. These will implement the earlier mentioned equation 2 for $i=1$ to 7. Since by definition of the half adder form the bit zero of the intermediate carry value will be zero, this means by virtue of the earlier equation 2 that bit zero of the final sum value must be the same as bit zero of the intermediate sum value. As discussed earlier, if the final sum value is to be $-2$, this will require that all bits of the final sum value other than the least significant bit are 1, and that the least significant bit is 0. Accordingly, inverter 255 is used to invert bit zero of the intermediate sum value (equivalent to bit zero of the final sum value), as a result of which AND gate 260 will only output a logic one value if the final sum value is −2.

This output from AND gate 260 is used as a shift signal to input to the associated shift logic 35, 45. Accordingly, if a logic one shift signal is produced by the detector 30, this will cause the shift logic 35 to shift the significand of the data element A right by 1 bit, whilst if alternatively a logic one shift signal is produced by the detector 40, this will cause the shift logic 45 to shift the significand of data element B right by 1 bit position.

In addition to determining the shift signal, it is required that the detectors 30, 40 also detect whether it is appropriate to use the near processing path instead of the far processing path. This will be the case if either shift signal from the detectors 30, 40 is set, but will also be the case if in fact the exponents are equal. Accordingly, the detectors 30, 40 will typically also include logic for detecting whether the two exponents are equal, and it will be appreciated by those skilled in the art that such logic can be implemented in a variety of ways. With reference to FIG. 2, the output from such "difference equals zero" detect logic will be routed to OR gate 270 along with the shift signal output by AND gate 260, with the output of the OR gate 270 providing the select signal. Accordingly, the select signal will be set if either the shift signal is set or the output from a difference equals zero detector is set. This select signal, which is produced in pipeline stage N1, can be sent to enable logic to cause that enable logic to then disable the logic in the far processing path in the event that the select signal is set.

Hence, this early generation of a select signal enables the far processing path to be turned off at an early stage in the event that the alignment condition required for using the near path is detected, thus allowing significant power savings to be achieved. In addition, since the detectors 30, 40 detect the actual presence of the required alignment condition for using the near path, rather than merely making a prediction about the presence of that alignment condition, it can be guaranteed that any shifts performed by the shift logic 35, 45 are correct. This means that the logic in pipeline stage N1 can be shared by both the near path logic and the far path logic, providing savings in terms of area and power.

Figure 4:
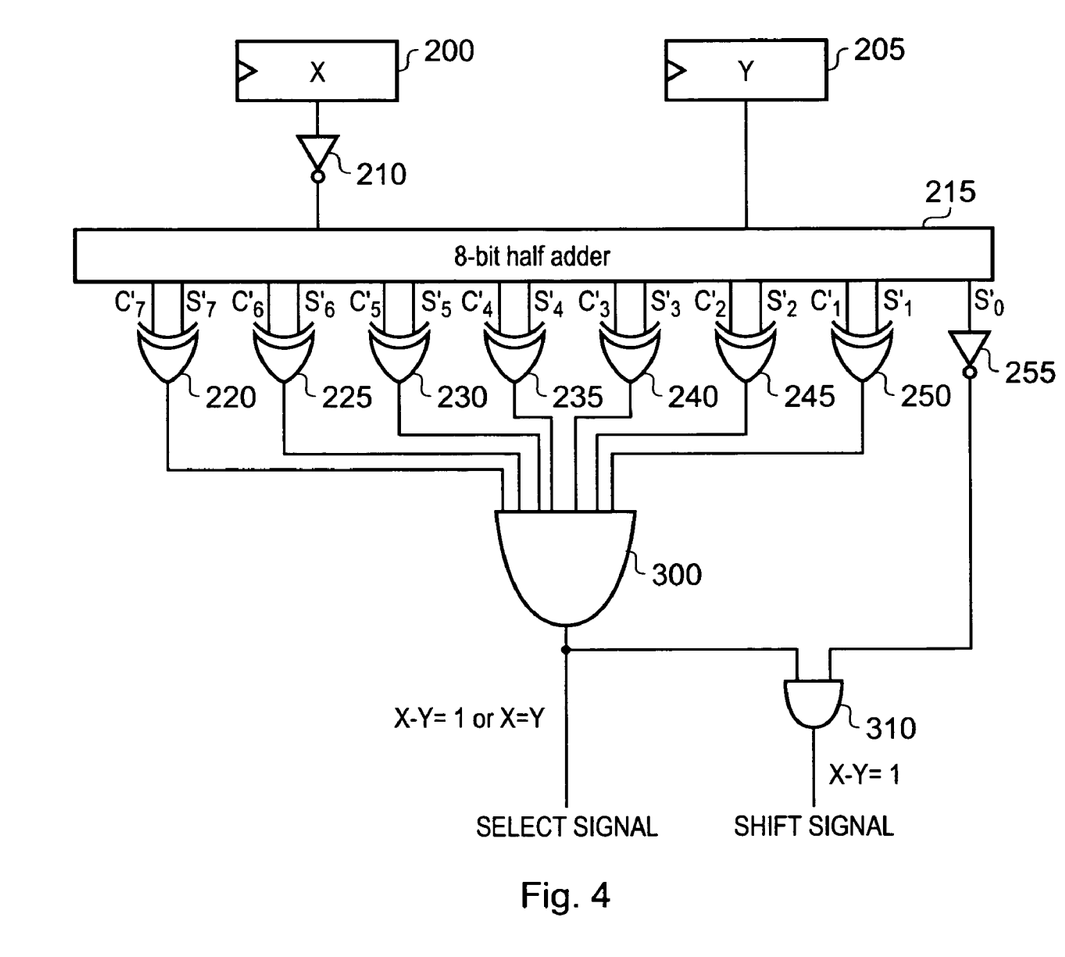
FIG. 4 illustrates an alternative embodiment of the difference equals one/zero detector of FIG. 1.

FIG. 4 is a block diagram illustrating an alternative configuration of the detector logic 30 or 40, in which the detection of both exponents being equal is performed directly by the logic that is being used to detect whether the exponents differ by one. As can be seen by comparison of FIG. 4 with FIG. 2, the 8-bit AND gate 260 of FIG. 2 is replaced by a 7-bit input AND gate 300. Given the earlier discussions, it will be appreciated that if the exponents are equal, the sum value output by the detector logic will have a value of −1 (i.e. 11111111), whilst if the exponents differ by one the sum value will have a value of −2 (i.e. 11111110). Accordingly, if all bits other than the least significant bits are set to a logic one value, this will directly indicate that the select signal should be set, since this will confirm that the exponents either differ by one, or are equal. The condition that the exponents differ by one can then be captured by routing the output from AND gate 300 to the input of AND gate 310, which also receives the output from inverter 255. Hence, it can be seen that the logic of FIG. 4 will produce both the shift signal and the select signal, which can then be used in the manner described earlier with reference to FIG. 2.

Figure 5:
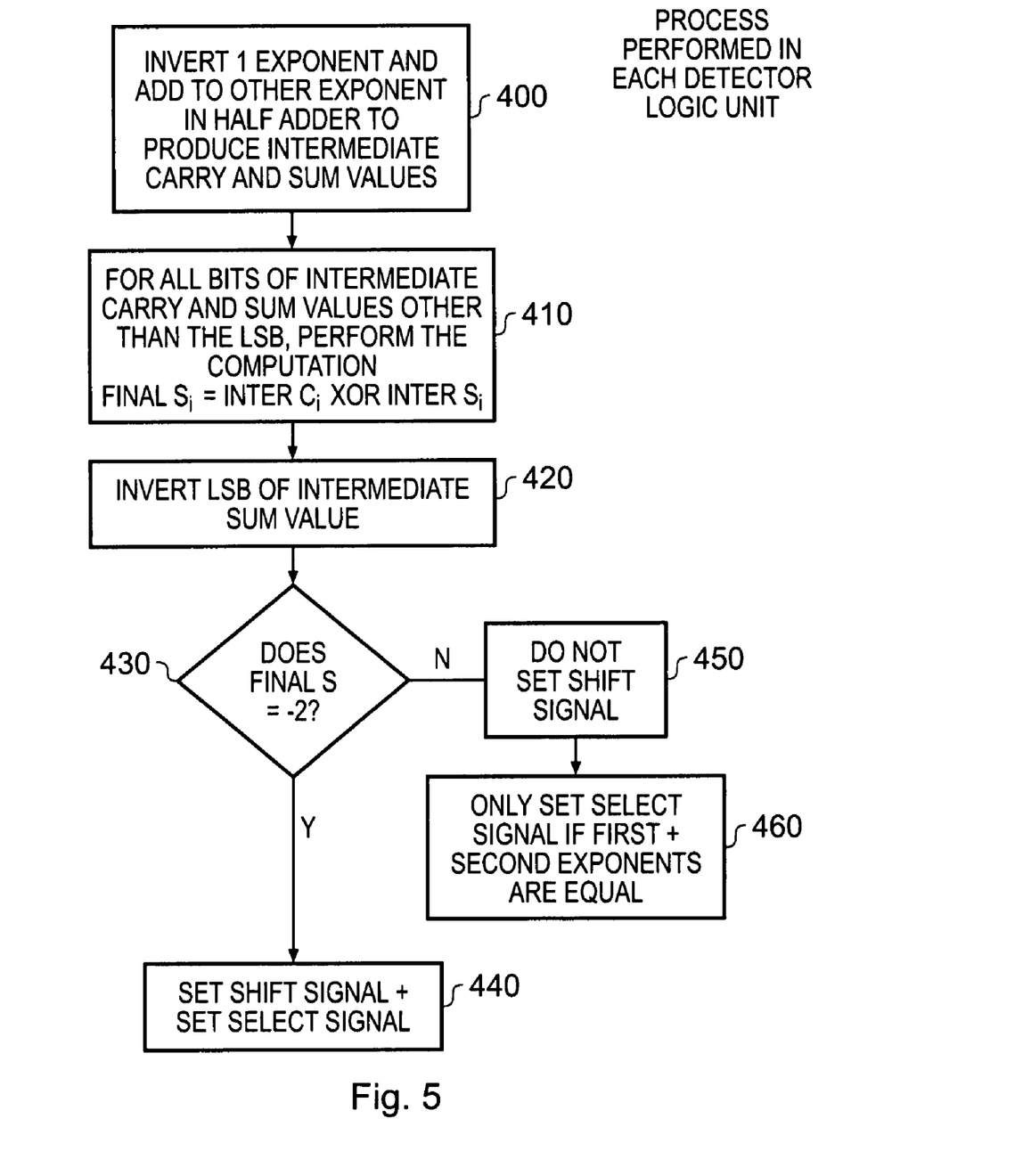
FIG. 5 is a flow diagram illustrating the processing performed within each difference equals one/zero detector of FIG. 1.

FIG. 5 is a flow diagram schematically illustrating the processing performed within each detector logic unit 30, 40. At step 400, one of the exponents is inverted and added to the other exponent in half adder logic in order to produce an intermediate carry value and an intermediate sum value. Then, at step 410, the computation $s_i = c'_i \text{XOR } s'_i$ is performed for all bits of the intermediate carry and sum values other than the least significant bit. Meanwhile, at step 420, the least significant bit of the intermediate sum value is inverted. By reference to FIGS. 2 and 4, it will be appreciated that in one embodiment steps 410 and 420 are performed in parallel.

Then, at step 430, it is determined whether the sum value produced is equal to −2, and if so the process proceeds to step 440, where the shift signal is set and the select signal is set. In FIG. 2, this occurs via the outputs from AND gate 260 and OR gate 270, whilst in FIG. 4 this occurs via the outputs from AND gates 300 and 310.

If at step 430 it is determined that the sum value does not equal −2, then the shift signal is not set at step 450. The process then proceeds to step 460, where the select signal is then only set by the detector logic unit if the first and second exponents are detected to be equal.

It will be appreciated that the process of FIG. 5 is performed independently within each detector logic unit 30, 40, with the detector logic 40 inverting the first exponent, whilst the detector 30 inverts the second exponent.

The logic of FIG. 2 or 4 provides a particularly efficient technique for allowing quick detection of a difference of one between the exponents of the two input floating point data elements. For example, with reference to the embodiment of FIG. 2, the delay for an 8-bit implementation will be the delay of two XOR gates followed by an 8-input AND function (for example logic equivalent to an 8-input AND gate). This computation can be performed in the first pipeline stage N1 to enable the shift and select signals to be generated during that first pipeline stage.

Returning to FIG. 1, it can be seen that the outputs from the shift logic 35 and the shift logic 45 are latched in the registers 55, 60, respectively, and accordingly these registers will store the 24-bit significands of the input data elements A and B, shifted one place to the right as appropriate.

Figure 7:
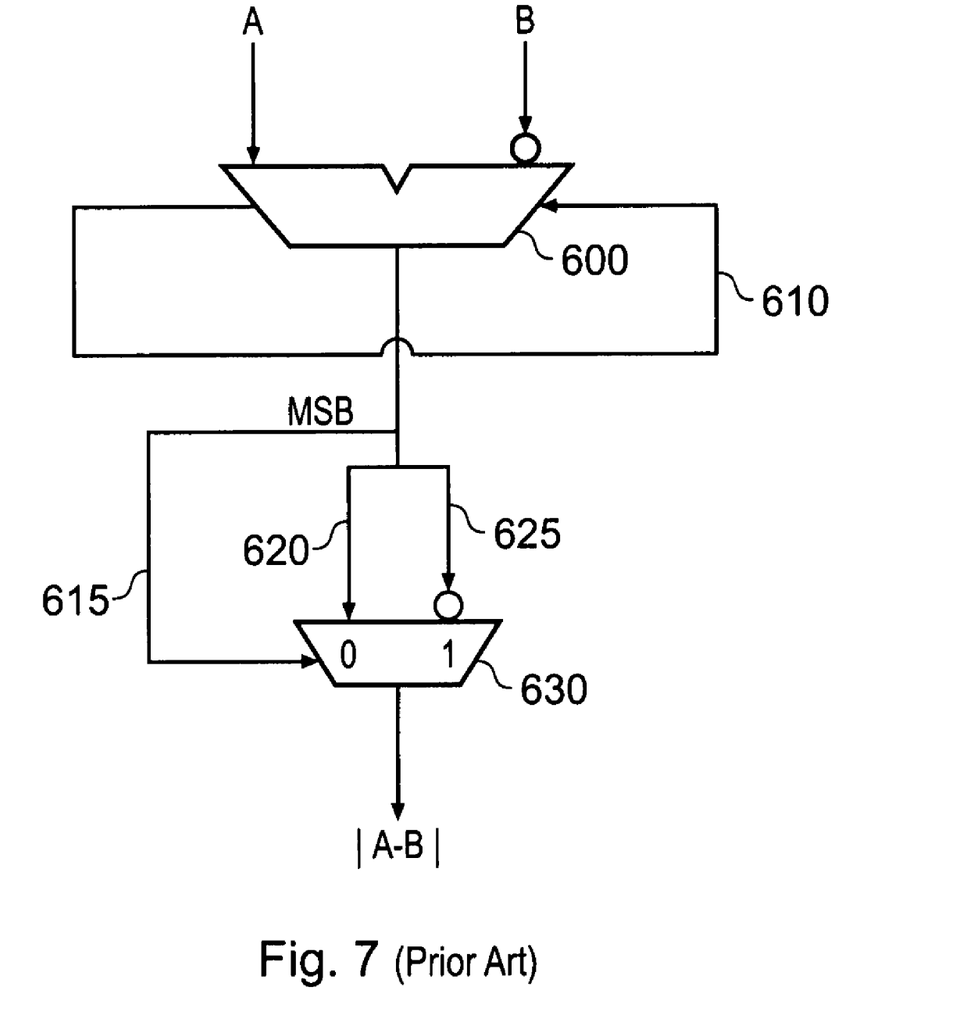
FIG. 7 is a block diagram illustrating a prior art end around carry adder.

In pipeline stage N2, it is required to determine the absolute difference between these stored significand values (the absolute difference being the magnitude of the difference between the two data elements, expressed as a positive value). One known approach for performing such an absolute difference computation is to use an end around carry adder such as that illustrated in FIG. 7. As shown in FIG. 7, the significand from data element B is inverted prior to input to the end around carry adder 600, with the significand of data element A being input without inversion. The carry out from the adder 600 is routed via path 610 as a carry in to the adder. The output from the end around carry adder is routed via path 620 to one input of the multiplexer 630, and is also routed via path 625 where it is inverted prior to input to the other input of the multiplexer 630.

If the significand of A is larger than the significand of B, then this will be indicated by a logic zero value in the most significant bit position of the output from the end around carry adder 600, and hence this most significant bit can be routed over path 615 to control the output from the multiplexer 630. Similarly, if the significand of A is less than the significand of B, then the output from the end around carry adder will be negative (as indicated by a logic one value in the most significant bit position), and negation of the result is required in order to produce the absolute difference value. This can be achieved by using the most significant bit of the output from the end around carry adder to select as the output from the multiplexer 630 the signal received at the second input of that multiplexer (i.e. an inverted version of the output from the end around carry adder).

However, such an end around carry adder is relatively slow when compared with a normal adder, and this speed problem is compounded by the fact that the selection of the output or the inverted version of the output can only be made once the most significant bit of the output from the end around carry adder is known.

As cycle times reduce, it is envisaged that there will be insufficient time in the pipeline stage N2 for the use of such an end around carry adder to compute the absolute difference.

As an alternative to using such an end around carry adder, an approach can be used where a determination is made as to which of the first and second data elements is the larger, with the ordering of the significand values then being swapped if required prior to input to a normal adder. This approach can ensure that when the normal adder is used to subtract one significand from the other, the significand of the smaller data element is the one that is subtracted from the other significand, thereby ensuring that the output from the adder is a positive value. However, as cycle times decrease, it is envisaged that there will be insufficient time in pipeline stage N2 to allow such swapping of the significand values to take place prior to input to the adder.

In accordance with the embodiment illustrated in FIG. 1, absolute difference logic is provided in pipeline stage 2 consisting of the inverter 70, the adder 80, the inverter 85 and the multiplexer 90. The adder 80 and the multiplexer 90 receive a signal stored in the carry register 65, this signal being generated by logic 50 provided in pipeline stage N1. In the example illustrated in FIG. 1, this logic 50 is arranged to receive the exponent and fraction portions from both input data elements A and B, and to detect which of the data elements is the largest. It will be appreciated by those skilled in the art that the logic 50 can be arranged in a variety of ways. However, in one embodiment, the logic 50 is arranged to perform a non-redundant subtract operation on its two input values, with a comparison result being output for storage in the carry register 65 which comprises a carry out result of the non-redundant subtract operation. In particular, the comparison result is set to a logic one value if the data element A is larger than or equal to the data element B, and is set to a logic zero value if the data element B is larger than the data element A.

Before discussing the operation of the absolute difference logic employed in pipeline stage N2, the following discussion is provided to indicate why the value of the carry signal stored in the carry register 65 can be arranged to ensure that the absolute difference logic produces a positive result without the need to provide logic for selectively swapping the ordering of the significand values before they are input to the absolute difference logic.

A two's complement adder produces a difference by inverting the minuend, and then adding it to the subtrahend with a carry-in of one. This works because for two's complement numbers, $A-B=A+\overline{B}+1$. In the present context, the significand values are unsigned values that can be treated as two's complement numbers.

The technique of the present embodiment is to manipulate the carry-in to the adder based on the magnitude comparison done in the preceding cycle by logic 50. Suppose that $A \geq B$. In this case, A–B is positive, so we set the carry-in to one and compute $A+\overline{B}+1$.

Now suppose A<B. In this case, A–B is negative, and in order to easily compute the absolute value, we set carry-in to zero and compute $A+\overline{B}$, and then invert the sum to get |A–B|.

The reason this works is that, for two's complement numbers, $-X=\overline{X}+1$, and so $\overline{X}=-X-1$, which means that $X=\overline{\overline{X}}=\overline{-X-1}$. This means that if we compute $-X-1$, then we can get X with a simple inversion. With respect to our original problem, $-X=A-B$, and $-X-1=A-B-1=A+\overline{B}$.

Accordingly, returning to FIG. 1, it can be seen that the output from register 60 is inverted by inverter 70 and then provided as one of the inputs to the adder 80. The other input of the adder logic 80 is the significand value stored in the register 55. If the carry value in register 65 is set to one, indicating that data element A is larger than data element B, then a carry-in of one will be fed to the adder 80, and the output from the adder 80 will correctly identify the absolute difference value. Accordingly, the same logic one value from the carry register 65 can be used to cause the multiplexer 90 to output the output from the adder 80 directly for storage in the sum register 100. However, if the value in the carry register 65 is a logic zero value, then the adder 80 will receive a logic zero value as a carry-in, and the output from the adder 80 will need to be inverted in order to produce the absolute difference value. This is achieved by using the carry value from the carry register 65 to drive the multiplexer 90, which in this scenario will cause the multiplexer to output to the sum register 100 the inverted input received via inverter 85.

Accordingly, it can be seen that through the use of the absolute difference logic illustrated in pipeline stage N2 of FIG. 1, the absolute difference value can be generated and stored in the sum register 100 without the need to provide any means for swapping the ordering of the inputs to the adder 80. This provides a significant performance improvement, which ensures that the absolute difference can be calculated in a single pipeline stage N2.

As mentioned earlier, when the input floating point data elements require at most a 1-bit alignment, then it is possible that when performing an unlike-signed addition operation within the near path logic, massive cancellation may occur. This means that when logically subtracting one significand value from the other, the result may have a significant number of leading zeros. The presence of such leading zeros is detected by the leading zero adjust detector 75 which is arranged to receive the output from register 55 and the inverted version of the output from register 60 as produced by inverter 70. The leading zero adjust detector 75 is constructed in a standard manner, and produces a 5-bit output signal identifying the number of leading zeros predicted to exist in the sum stored in the register 100, this value being stored in the register 95. Normalisation logic 105 is then provided in pipeline stage N3 for normalising the value stored in the register 100 based on the LZA value output from register 95.

As will be appreciated by those skilled in the art, since the leading zero adjust detector 75 is an anticipator of the number of leading zeros, it is possible that the adjustment performed by the normalisation logic 105 is out by 1 bit. Hence, once the normalised result has been produced by the normalisation logic 105, the output is evaluated to check whether the most significant bit is a logic one value. If it is, then no further adjustment is required, whereas if the most significant bit is a logic zero value, then a further 1-bit adjustment is performed within the 1-bit adjustment logic 110, whereafter the result is stored in the register 115.

The result in the register 115 is the result of the unlike-signed addition operation performed by the near path logic. In pipeline stage N4, this is routed to a multiplexer 120, which is also arranged to receive the result from the far path, such that one of the results can be selected for storing in the adder result register 125 as the result of the unlike-signed addition operation.

As mentioned earlier, in preferred embodiments, if the select signal from either detector 30, 40 is set in pipeline stage N1, then this indicates that the near path should be used to perform the operation rather than the far path, and accordingly a signal derived from this select signal can be used to control the multiplexer 120.

In one embodiment of the present invention, each input operand to the data processing apparatus only includes a single floating point data element. However, in an alternative embodiment, a Single Instruction Multiple Data (SIMD) processing is performed by the data processing apparatus, in which event each input operand will comprise a plurality of floating point data elements. In such embodiments, it is envisaged that the logic of FIG. 1 will be replicated for each pair of first and second floating point data elements provided by the input operands. Accordingly, a pair of first and second floating point data elements extracted from first and second operands will be stored in the registers 10, 20, with the logic of FIG. 1 then being replicated for each pair of first and second floating point data elements.

Figure 6:
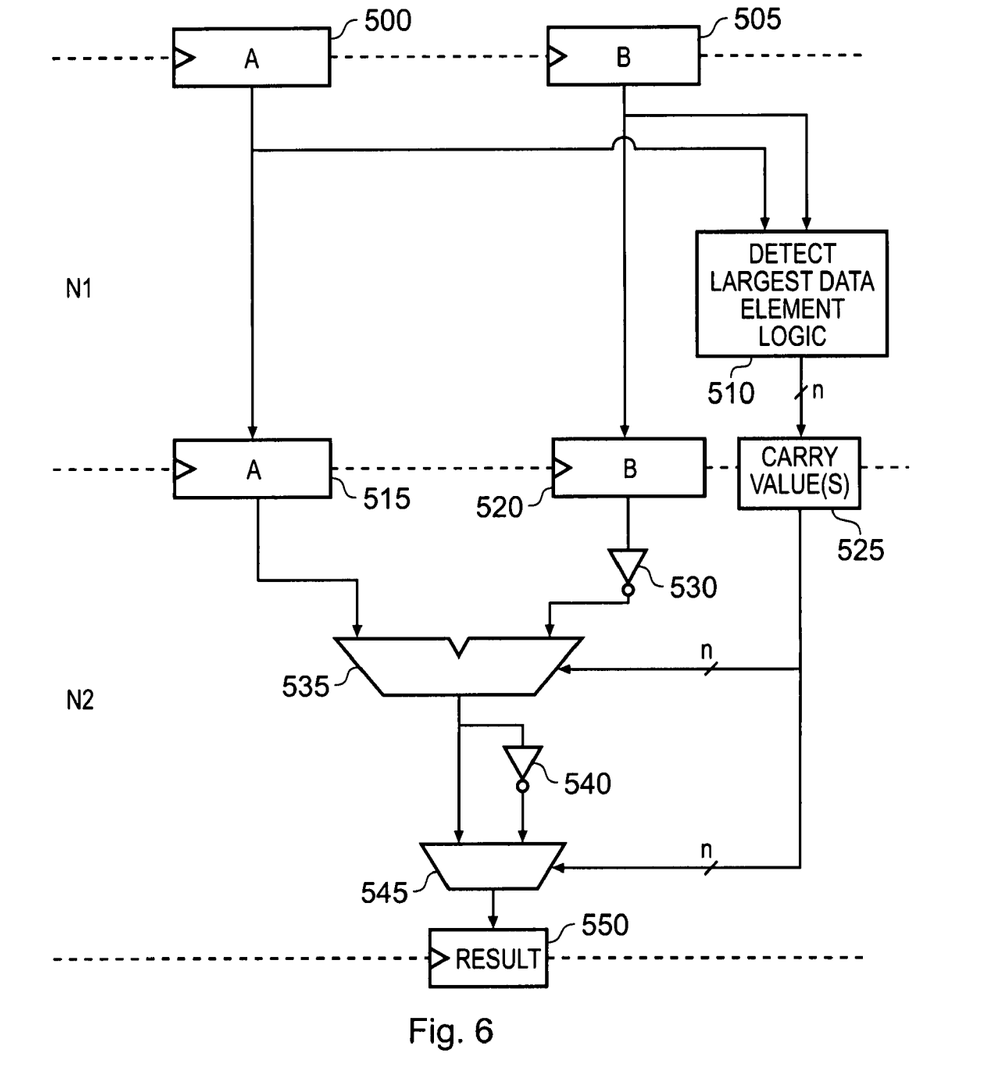
FIG. 6 is a block diagram of logic provided within a data processing apparatus to compute an absolute difference between first and second integer data elements in accordance with one embodiment.

The absolute difference logic described earlier can also be applied in a data processing apparatus used to manipulate integer data elements, as is illustrated by FIG. 6. In the example of FIG. 6, the first integer data element is stored in register 500 and the second integer data element is stored in a register 505. In pipeline stage N1, the logic 510 is arranged to receive the first and second integer data elements and to determine which is the largest value, with a comparison result being output for storing in the carry value register 525 indicative of the result of that comparison. As will be discussed later, the logic 510 can actually be arranged to produce a plurality of comparison results in the event that SIMD processing is being performed, but for the time being we will assume that only a single integer data element is included within each input operand, and that accordingly the logic 510 produces a single comparison result (i.e. n=1).

The contents of the registers 500 and 505 pass directly through stage N1, where they are stored in registers 515, 520, respectively. Thereafter, the outputs of these registers 515 and 520 are routed through the absolute difference logic 530, 535, 540, 545, which operates in an identical manner to that discussed earlier with reference to the absolute difference logic 70, 80, 85, 90 of FIG. 1. This results in an absolute difference result being output from the multiplexer 545 for storing in the result register 550.

In one embodiment, it is envisaged that integer SIM processing may be performed within the data processing apparatus, in which event a first operand will comprise a plurality of first integer data elements and a second operand will comprise a plurality of second integer data elements. In such embodiments, the entire operands are stored in the registers 500, 505, with the logic 510 being operable to receive the first and second operands and to produce, for each pair of first and second integer data elements provided by the first and second operands, an associated comparison result for storing in the carry value register 525. Accordingly, if, for the sake of example, four integer data elements are included within each input operand, a 4-bit value will be output from the logic 510 for storing in the carry value register 525. In the general sense, an n-bit value is output from the logic 510 for storing in the carry value register 525, where n is equal to the number of integer data elements contained within each input operand.

Considering now pipeline stage N2, the inverter 530 will invert the entirety of the second operand B prior to inputting that inverted version of the operand to the adder 535. For each pair of first and second integer data elements, the adder 535 will then add the associated inverted data element from the second operand to the corresponding data element from the first operand and to the associated comparison result received from the carry value register 525 in order to produce an associated intermediate result. This will result in the output from the adder 535 containing a sequence of n intermediate results, with this sequence being inverted by inverter 540 to create an inverted sequence. The multiplexer 545 is then arranged, for each pair of first and second integer data elements, to output as the associated absolute difference either the associated intermediate result or the inverted version of the associated intermediate result dependent on the associated comparison result received from the carry value register 525.

Accordingly, it can be seen that when performing integer arithmetic, a single block of absolute difference logic, and associated comparison logic 510 can be used to calculate in parallel the absolute difference for a plurality of pairs of integer data elements contained within the pair of input operands.

Figure 8:
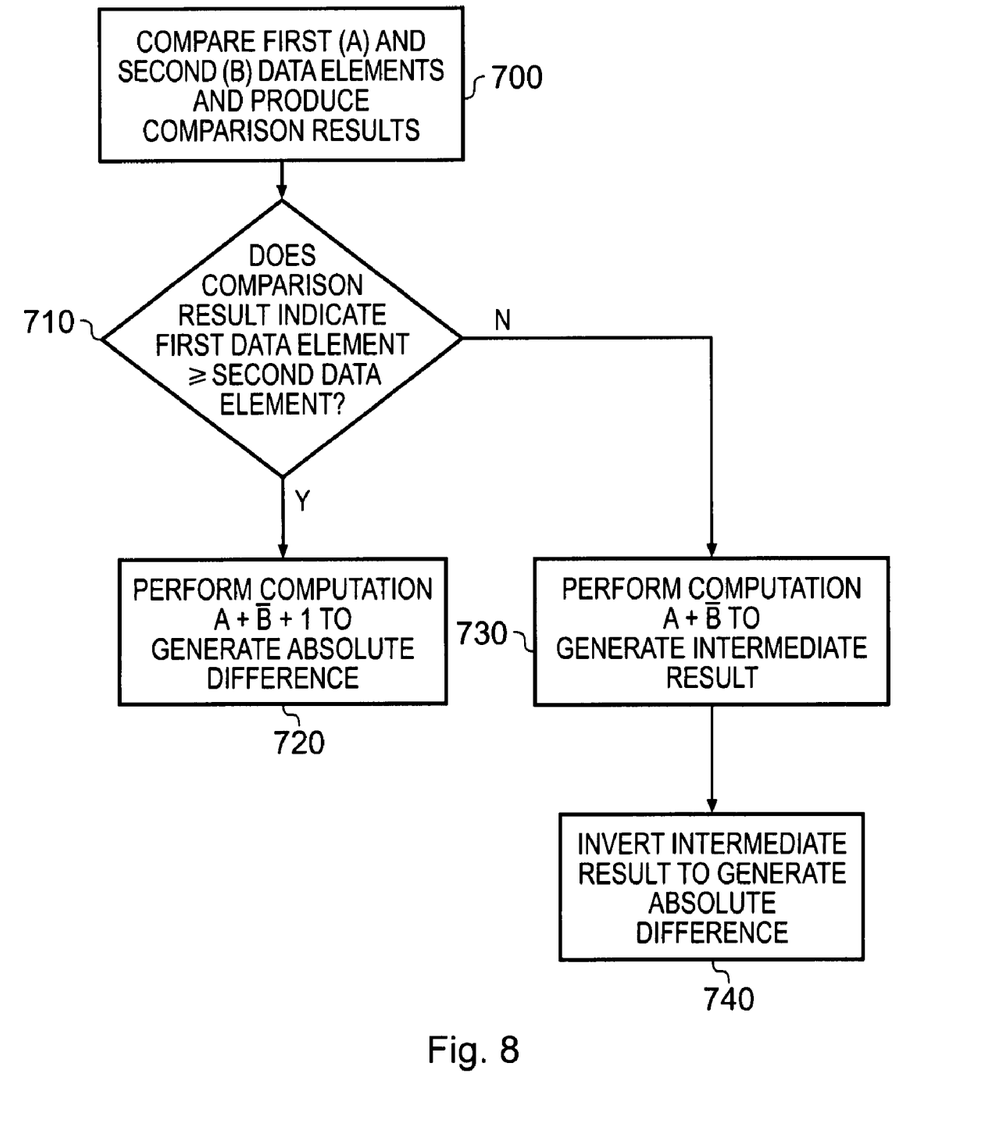
FIG. 8 is a flow diagram illustrating the processing steps performed in one embodiment to calculate an absolute difference between first and second data elements.

FIG. 8 is a block diagram illustrating the process performed when computing an absolute difference for first and second data elements when using the logic of either FIG. 1 or FIG. 6. For simplicity, FIG. 8 considers the non-SIMD approach. At step 700, the first and second data elements are compared and a comparison result is produced indicative of which data element is the larger data element. At step 710, it is then determined whether the comparison result indicates that the first data element is greater than or equal to the second data element. If this is the case, then the process proceeds to step 720, where the data element A is added to the inverted version of the data element B and added to a logic one value in order to generate the absolute difference.

However, if at step 710 it is determined that the comparison result indicates that the second data element is greater than the first data element, then process proceeds to step 730, where the data element A is added to the inverted version of the data element B to generate an intermediate result. Thereafter, at step 740, the intermediate result is inverted in order to generate the absolute difference.

By using the absolute difference logic discussed above with reference to FIGS. 1 and 6, the generation of the absolute difference can be produced in a particularly efficient manner. In particular, the critical path for the implementation of the absolute difference logic is the path involving a subtraction, inversion, and then the driving a two-input multiplexer. This provides a significantly faster implementation than the known prior art techniques.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
processing circuitry configured to perform a data processing operation on first and second data elements, the processing circuitry comprising:
comparison circuitry configured to compare at least a part of the first and second data elements in order to determine which of the first and second data elements is a larger data element, the comparison circuitry being configured to produce a comparison result which has a first value if the first data element is the larger data element and a second value if the second data element is the larger data element;
absolute difference circuitry configured to compute an absolute difference between a portion of the first data element and a portion of the second data element, the absolute difference circuitry comprising:
adder circuitry configured to invert one of said portions to produce an inverted data element portion and to add the inverted data element portion to the other of said portions and to the comparison result received from the comparison circuitry in order to produce an intermediate result; and
output circuitry configured to generate an inverted version of the intermediate result and to output as the absolute difference either the intermediate result or the inverted version of the intermediate result dependent on the comparison result,
wherein the adder circuitry is configured to invert the portion of the second data element, and wherein comparison circuitry is configured to set the comparison result as input to the adder circuitry to a Logical 0 value if the second data element is the larger data element and to a logical 1 value otherwise.

2. A data processing apparatus as claimed in claim 1, wherein the output circuitry being configured to output as the absolute difference the inverted version of the intermediate result if the comparison result has a logic 0 value, and to output as the absolute difference the intermediate result if the comparison result has a logic 1 value.

3. A data processing apparatus as claimed in claim 1, wherein the comparison result is set to the first value if the first data element and the second data element have the same value.

4. A data processing apparatus as claimed in claim 1, wherein the comparison logic is configured to perform a non-redundant subtract operation on said at least a part of the first and second data elements, and the comparison result comprises a carry out result of the non-redundant subtract operation.

5. A data processing apparatus as claimed in claim 1, wherein the first and second data elements are floating point data elements, the first floating point data element specifying a first significand and the second floating point data element specifying a second significand, and the absolute difference logic being configured to compute the absolute difference between the first significand and the second significand.

6. A data processing apparatus as claimed in claim 5, wherein each of the first and second floating point data elements comprise sign, exponent and fraction portions, the first and second significands being derived from the corresponding fraction portions of the first and second floating point data elements, the at least a part of the first and second data elements compared by the comparison logic comprising the exponent and fraction portions of the first and second floating point data elements.

7. A data processing apparatus as claimed in claim 5, wherein the data processing apparatus is configured to receive first and second operands, the first operand comprising a plurality of said first floating point data elements, and the second operand comprising a corresponding plurality of said second floating point data elements, said comparison logic and said absolute difference logic being replicated within the data processing apparatus for each pair of first and second floating point data elements provided by the first and second operands.

8. A data processing apparatus as claimed in claim 1, wherein the first and second data elements are integer data elements, and the portion of the first and second data elements that the absolute difference logic is configured to compute the absolute difference for is the entirety of the first and second integer data elements.

9. A data processing apparatus as claimed in claim 8, wherein the at least a part of the first and second data elements compared by the comparison logic comprises the entirety of the first and second integer data elements.

10. A data processing apparatus as claimed in claim 8, wherein the data processing apparatus is configured to receive first and second operands, the first operand comprising a plurality of said first integer data elements, and the second operand comprising a corresponding plurality of said second integer data elements, said comparison logic being configured to receive the first and second operands and to produce, for each pair of first and second integer data elements provided by the first and second operands, an associated comparison result.

11. A data processing apparatus as claimed in claim 10, wherein:
the absolute difference logic is configured to receive the first and second operands;
the adder logic is configured to invert one of the first and second operands to produce a plurality of inverted integer data elements and, for each pair of first and second integer data elements, to add the associated inverted data element to the other of the first and second data elements and to the associated comparison result received from the comparison logic in order to produce an associated intermediate result; and
the output logic is configured to generate an inverted version of each associated intermediate result and, for each pair of first and second integer data elements, to output as the associated absolute difference either the associated intermediate result or the inverted version of the associated intermediate result dependent on the associated comparison result.

12. A method of operating a data processing apparatus to compute an absolute difference between a portion of a first data element and a portion of a second data element, comprising the steps of:
(a) comparing at least a part of the first and second data elements in order to determine which of the first and second data elements is a larger data element, and producing a comparison result which has a first value if the first data element is the larger data element and a second value if the second data element is the larger data element;
(b) employing adder circuitry to invert one of said portions to produce an inverted data element portion and to add the inverted data element portion to the other of said portions and to the comparison result produced at said step (a) in order to produce an intermediate result; and (c) generating an inverted version of the intermediate result and outputting as the absolute difference either the intermediate result or the inverted version of the intermediate result dependent on the comparison result, wherein the adder circuitry inverts the portion of the second data element and step (a) comprises the step of setting the comparison result as input to the adder circuitry to a logic 0 value if the second data element is the larger data element, or setting the comparison result to a logic 1 value otherwise.

13. A method as claimed in claim 12, wherein:
said step (c) comprises the step of outputting as the absolute difference the inverted version of the intermediate result if the comparison result has a logic 0 value, and outputting as the absolute difference the intermediate result if the comparison result has a logic 1 value.

14. A method as claimed in claim 12, wherein at said step (a) the comparison result is set to the first value if the first data element and the second data element have the same value.

15. A method as claimed in claim 12, wherein said step (a) comprises the step of performing a non-redundant subtract operation on said at least a part of the first and second data elements, the comparison result comprising a carry out result of the non-redundant subtract operation.

16. A method as claimed in claim 12, wherein the first and second data elements are floating point data elements, the first floating point data element specifying a first significand and the second floating point data element specifying a second significand, and said steps (b) and (c) are performed to compute the absolute difference between the first significand and the second significand.

17. A method as claimed in claim 16, wherein each of the first and second floating point data elements comprise sign, exponent and fraction portions, the first and second significands being derived from the corresponding fraction portions of the first and second floating point data elements, the at least a part of the first and second data elements compared at said step (a) comprising the exponent and fraction portions of the first and second floating point data elements.

18. A method as claimed in claim 16, wherein the data processing apparatus receives first and second operands, the first operand comprising a plurality of said first floating point data elements, and the second operand comprising a corresponding plurality of said second floating point data elements, said steps (a) to (c) being performed independently for each pair of first and second floating point data elements provided by the first and second operands.

19. A method as claimed in claim 12, wherein the first and second data elements are integer data elements, and the portion of the first and second data elements that the absolute difference is computed for is the entirety of the first and second integer data elements.

20. A method as claimed in claim 19, wherein the at least a part of the first and second data elements compared at said step (a) comprises the entirety of the first and second integer data elements.

21. A method as claimed in claim 19, wherein the data processing apparatus receives first and second operands, the first operand comprising a plurality of said first integer data elements, and the second operand comprising a corresponding plurality of said second integer data elements, at said step (a) the first and second operands being received and, for each pair of first and second integer data elements provided by the first and second operands, the comparison performed at said step (a) producing an associated comparison result.

22. A method as claimed in claim 21, wherein:
at said step (b) the adder logic receives the first and second operands, the adder logic inverting one of the first and second operands to produce a plurality of inverted integer data elements and, for each pair of first and second integer data elements, adding the associated inverted data element to the other of the first and second data elements and to the associated comparison result produced at said step (a) in order to produce an associated intermediate result; and
said step (c) generates an inverted version of each associated intermediate result and, for each pair of first and second integer data elements, outputs as the associated absolute difference either the associated intermediate result or the inverted version of the associated intermediate result dependent on the associated comparison result.

* * * * *